(12) United States Patent
Smith et al.

(10) Patent No.: US 6,616,403 B1
(45) Date of Patent: Sep. 9, 2003

(54) FLOATING ELECTRIC GENERATOR

(76) Inventors: Matt H. Smith, 3247 Highlawn Dr., Twin Falls, ID (US) 83301; Spencer A. Smith, 3247 Highlawn Dr., Twin Falls, ID (US) 83301

( * ) Notice: Subject to any disclaimer, the term of this patent is extended or adjusted under 35 U.S.C. 154(b) by 0 days.

(21) Appl. No.: 10/119,437

(22) Filed: Apr. 8, 2002

(51) Int. Cl.7 .................................................. F03B 7/00
(52) U.S. Cl. ..................... 415/3.1; 415/7; 415/124.1; 416/84; 416/86; 416/170 R; 416/DIG. 4; 416/DIG. 6
(58) Field of Search .............................. 415/7, 8, 122.1, 415/124.1, 905, 3.1; 416/84, 85, 86, 170 R, DIG. 4, DIG. 6; 290/43, 54

(56) References Cited

U.S. PATENT DOCUMENTS

| | | | | |
|---|---|---|---|---|
| 385,261 A | * | 6/1888 | Garrison | 416/85 |
| 658,969 A | * | 10/1900 | Walter | 416/84 |
| 1,074,292 A | * | 9/1913 | Reynolds | 416/86 |
| 1,157,416 A | | 10/1915 | Olive | |
| 1,263,865 A | | 4/1918 | Dale | |
| 4,239,976 A | | 12/1980 | Collard | 290/42 |
| 4,383,797 A | | 5/1983 | Lee | 415/7 |
| 4,872,805 A | | 10/1989 | Horiuchi et al. | 415/7 |
| 5,947,678 A | | 9/1999 | Bergstein | 415/3.1 |
| 6,238,559 B1 | | 5/2001 | Heyek | 210/242.1 |
| 6,247,981 B1 | | 6/2001 | Farley et al. | 440/90 |
| 6,551,053 B1 | * | 4/2003 | Schuetz | 415/3.1 |

* cited by examiner

*Primary Examiner*—Ninh H. Nguyen
(74) *Attorney, Agent, or Firm*—Frank J. Dykas; Robert L. Shaver; Stephen M. Nipper

(57) ABSTRACT

A device for obtaining electric power from moving water, made up of a floating cylindrical body having a first end extending to a second end along a cylindrical surface having at least two blades. Each end of the floating cylindrical body is fixedly connected to a waterwheel sprocket, and rotatably connected to an arm pivotally connected to an anchor. The waterwheel sprockets are connected to a generator sprocket by a drive means. When the new device is placed and held in a body of moving water, the moving water impacts against the blades and causes the floating cylindrical body to rotate. The rotation of the floating cylindrical body causes the first and second waterwheel sprockets to rotate and move the drive means which are connected to a generator and in turn create electricity.

20 Claims, 4 Drawing Sheets

FLOATING ELECTRIC GENERATOR

BACKGROUND OF THE INVENTION

1. Field of the Invention

The present invention generally relates to electric power generating waterwheels, and more particularly to an adjustable floating waterwheel for use in moving water.

2. Background Information

Modern society revolves around the use and availability of electrical power. Many methods and devices have been developed to create electricity. Electrical power can be created from generators powered by the combustion of natural resources such as wood, coal, oil, or gas. These methods, however, also produce harmful pollutants and consume natural resources. Electricity has also been harnessed from nuclear fission reactors. This method, however, produces harmful radioactive waste.

Hydroelectric power generation is a generally clean method of producing electricity which does not have these negative effects. However, the electricity produced by this method must be transmitted from the power generation location to the site where the electricity is needed. The cost of providing and installing the power transmission systems can be great, and in some cases prohibited because of the associated cost. In addition, the difficulty of obtaining permits and access to place the transmission cables may make electrical transmission to some locations nearly impossible to obtain.

In arid areas where the water supply is limited and water is needed in a variety of applications, a conflict may arise between these various uses for the same water. For example, in an arid area where water is needed for both irrigation and for power generation, a choice must be made between leaving the water in the river for hydroelectric power generation or allowing the water to be diverted in to irrigation canals. This choice is especially difficult on irrigators who need both the water to irrigate and the electricity to pump the water through an irrigation system.

Waterwheels are a known method for obtaining power from moving water. However, most waterwheels also have various problems associated with their use. First, most waterwheels are permanently fixed in their location and do not allow adjustment to compensate for rises and falls in water levels. This inability to adjust results in times where the waterwheels will not function or function with decreased efficiency due to an inability to maintain a desired amount of water contact upon the blades. The fixed location of most prior art waterwheels also makes the wheel prone to being jammed or impaired by floating debris in the water. When this floating debris contacts the blades of the waterwheel, the debris can jam and break the blades of the wheel and may even stop the waterwheel from functioning.

What is needed is a device for producing clean electricity from natural sources in remote locations. What is also needed is a device for obtaining electricity from moving irrigation water in arid areas. What is also needed is a floating waterwheel capable of adjusting to rising and falling water levels and passing over floating debris so as to prevent the waterwheel from being broken or jammed.

Accordingly, it is an object of the present invention to provide a device for obtaining clean, cheap electric power generation in remote locations. Another object of the invention is to provide a device for obtaining electrical power from moving irrigation water in arid areas. Another object of the invention is to provide a floating waterwheel with pivotally positioned arms capable of adjusting to rising and falling water levels and able to pass over floating debris. A further object of the invention is to provide a floating waterwheel with adjustable ballast capable of having a varied profile in the water.

Additional objects, advantages, novel features of the present invention will be set forth in part in the description which follows and in part will become apparent to those skilled in the art upon examination of the following, or may be learned by practice of the invention.

The object and advantages of the invention may be realized and obtained by means of the talities and combinations particularly pointed out in the appended claims.

SUMMARY OF THE INVENTION

These objects are achieved through the use of a device having a floating waterwheel connected to an electric generator. This device is made up of a floating cylindrical body having a first end extending to a second end along a cylindrical surface and defining an inner chamber accessible by a resealable bung therein. Attached to the cylindrical surface of the floating cylindrical body are at least two blades. Each end of the floating cylindrical body is fixedly connected to a waterwheel sprocket, and rotatably connected to a pivot arm. Each pivot arm is then pivotally connected to an anchor means. Each waterwheel sprocket is connected to an electric generator by a drive means.

In use, the device is placed in a body of moving water and held in a desired location within the water by the pivot arms and the anchor means. The moving water impacts the blades and causes the floating cylindrical body to rotate. The rotation of the floating cylindrical body causes the waterwheel sprockets to rotate and engage the drive means. The drive means engage the electric generator which then creates electricity.

The waterwheel is pivotally connected to the anchor means and floats. Thus, the waterwheel raises and lowers automatically to adjust to rising and falling water levels and allows passage of floating debris beneath. This device allows electrical power to be generated in a clean, efficient manner in areas where moving water exists, these areas include but are not limited to remote locations, and arid areas having irrigation canals.

Still other objects and advantages of the present invention will become readily apparent to those skilled in this art from the following detailed description wherein we have shown and described only the preferred embodiment of the invention, simply by way of illustration of the best mode contemplated for carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
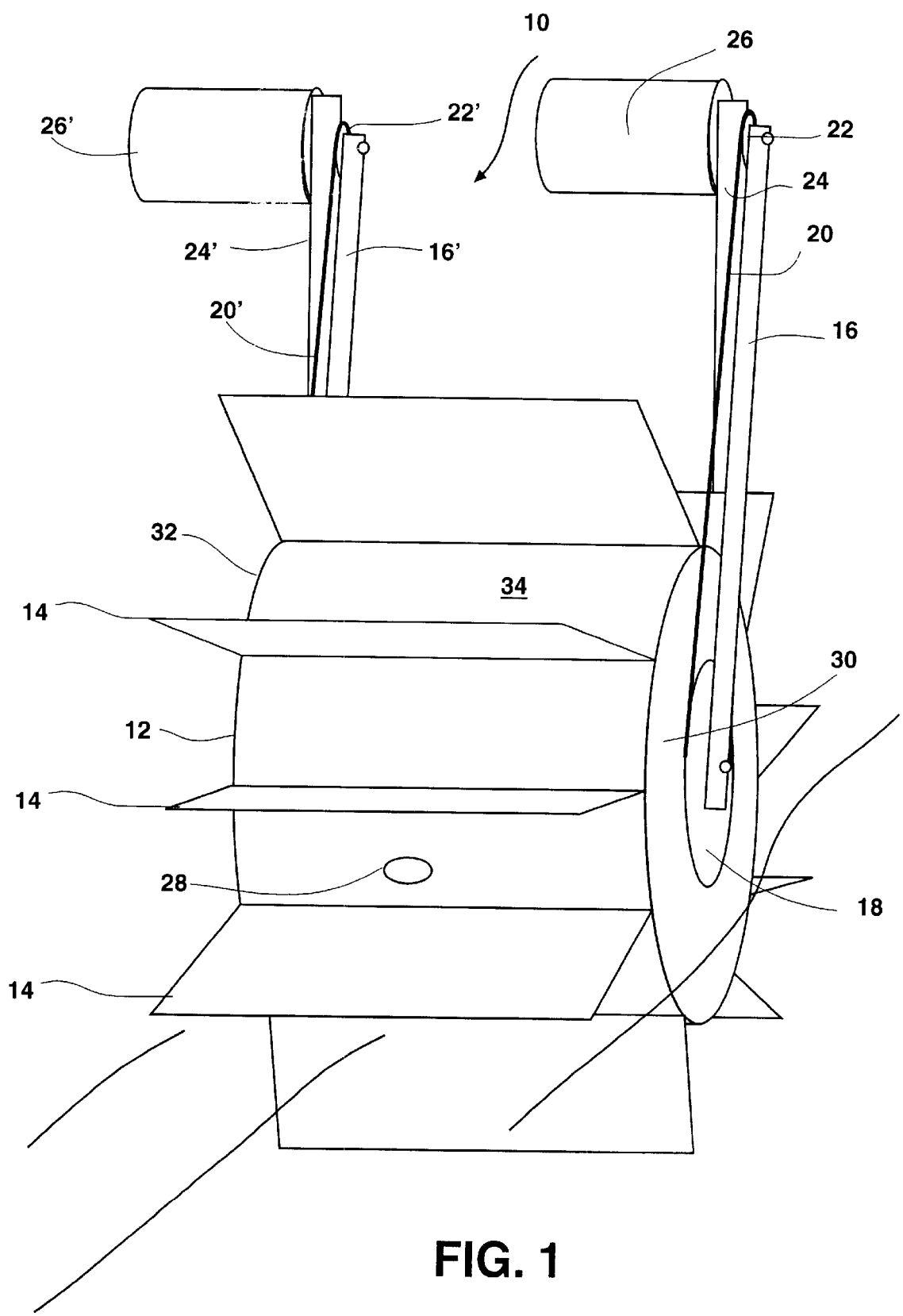
FIG. 1 is a perspective view of a first embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a waterwheel for generating electric power. In FIG. 1, a perspective view of the first embodiment of the present invention is shown. The invention is comprised of a floating body 12 having a first end 30 extending to a second end 32 along a generally cylindrical surface 34. While in a preferred embodiment, the shape of the floating body 12 is cylindrical, any shape that allows for connection of at least one blade as well as generally unimpeded rotational movement may be used.

At least one blade 14 is attached to the surface 34. This connection is a solid connection so as to prevent the accumulation of debris therein. The floating body 12 has a bung 28 which may be located anywhere along the surface 34 or the ends 30, 32 of the floating body 12. The floating body 12 has at least one waterwheel sprocket 18 fixedly attached to a first end 30. This waterwheel sprocket 18 is then connected to a generator sprocket 22 by a drive means 20.

In this embodiment, the floating body 12 also has a second waterwheel sprocket 18' (not shown) fixedly attached to the second end 32. Each waterwheel sprocket 18, 18' is connected to a generator sprocket 22, 22' by a drive means 20, 20'. In this embodiment, the drive means 20, 20' is a continuous connecting linkage such as a chain or belt, but any means capable of delivering a transfer of energy from the waterwheel sprockets 18, 18' to the generator sprockets 22, 22' may be used. These sprockets 18,18', 22, 22' may or may not have teeth. In a preferred embodiment of the invention, the generator sprocket 22 is dimensioned to be smaller than the waterwheel sprocket 18. The larger the waterwheel sprocket 18 and the smaller the generator sprocket 22 are in comparison to each other, the greater the mechanical advantage will be and the faster the generator sprocket 22 will spin when the floating body 12 is acted upon by the same force.

The floating body 12, is held in a desired location in the water by a first arm 16, and a second arm 16'. The first arm 16 is rotatably connected to the first end 30 of the floating body 12 and pivotally attached to an anchor means 24. A second arm 16' is rotatably attached to the second end of the floating body 32, and is pivotally attached to a second anchor means 24'. These arms 16, 16' secure the floating body 12 within the current of the moving water and assist to maintain its location.

The pivotal attachment of the arms 16, 16' to the anchor means 24, 24' allows the floating body 12 to rise and fall as the level of water increases and decreases. This feature also allows the floating body 12 to rise above and pass over objects such as floating debris within the body of moving water. The rotatable connection of the arms 16, 16' to the ends of floating body 12 allows free rotational movement of the floating cylindrical body 12 about an axis formed between the connection location of the arms 16, 16' to the ends 30, 32 of the floating rotational device.

These arms 16, 16' also ensure that a desired distance between the floating body 12 and a generator 26 is maintained. This ensures that an appropriate amount of tension is maintained on the drive means 20, 20' between the waterwheel sprockets 18, 18' and the generator sprockets 22, 22'.

The anchors 24, 24' to which the device is connected may be a post, bridge or any other means that is solidly affixed in respect to the flow of the water. Depending upon the depth and flow of the water, these anchors may be permanent structures or removable structures used only for a limited period of time. In one embodiment of the present invention, the anchor means could be connected to a bridge or a walkway over a body of moving water, for example an irrigation canal. In another embodiment of the present invention, the anchor means could be a post or pylon affixed within a body of water.

In use, moving water impacts the blades 14 and causes the floating body 12 to rotate. The rotation of the floating body 12 causes the waterwheel sprockets 18, 18' to turn. These waterwheel sprockets 18, 18' then engage the drive means 20, 20'. The movement of the drive means 20, 20' causes the generator sprockets 22, 22' to turn, thus enabling electricity to be generated within the generator 26.

The performance of this device 10 is enhanced by adjusting the size of the blades 14 and by coating the blades 14 with water-repellent materials. In faster moving, shallow water, shorter blades may be used, while in slower moving, deep water longer blades may be used. In addition, coating the blades with a water repellent material reduces the amount of water adhering to the blades thereby decreasing the amount of drag on the blades and increasing the rate at which the floating body 12 will spin.

The bung 28 allows access to an inner chamber of the floating body (not shown) while at the same time maintaining a waterproof closure. This bung allows materials such as water, sand, dirt, etc., to be added to the inner chamber. The addition of these materials increases the weight of the floating cylindrical body and lowers the profile of the device in the water. Likewise, removing materials from the inner chamber decreases the weight of the floating body 12 and raises the profile of the device in the water. The varying of the profile of the floating cylindrical body 12 allows for maximum engagement of the blades 14 with the water.

This device can be used in a variety of applications. In one application of the present embodiment, the arms 16, 16' are connected to an anchor means 24, 24' which is not within the stream itself, such as a bridge or a walkway over an irrigation canal. Another application involves the use of a device in a free flowing stream or river. Other applications may also be appropriate for the use of the invention.

Figure 2:
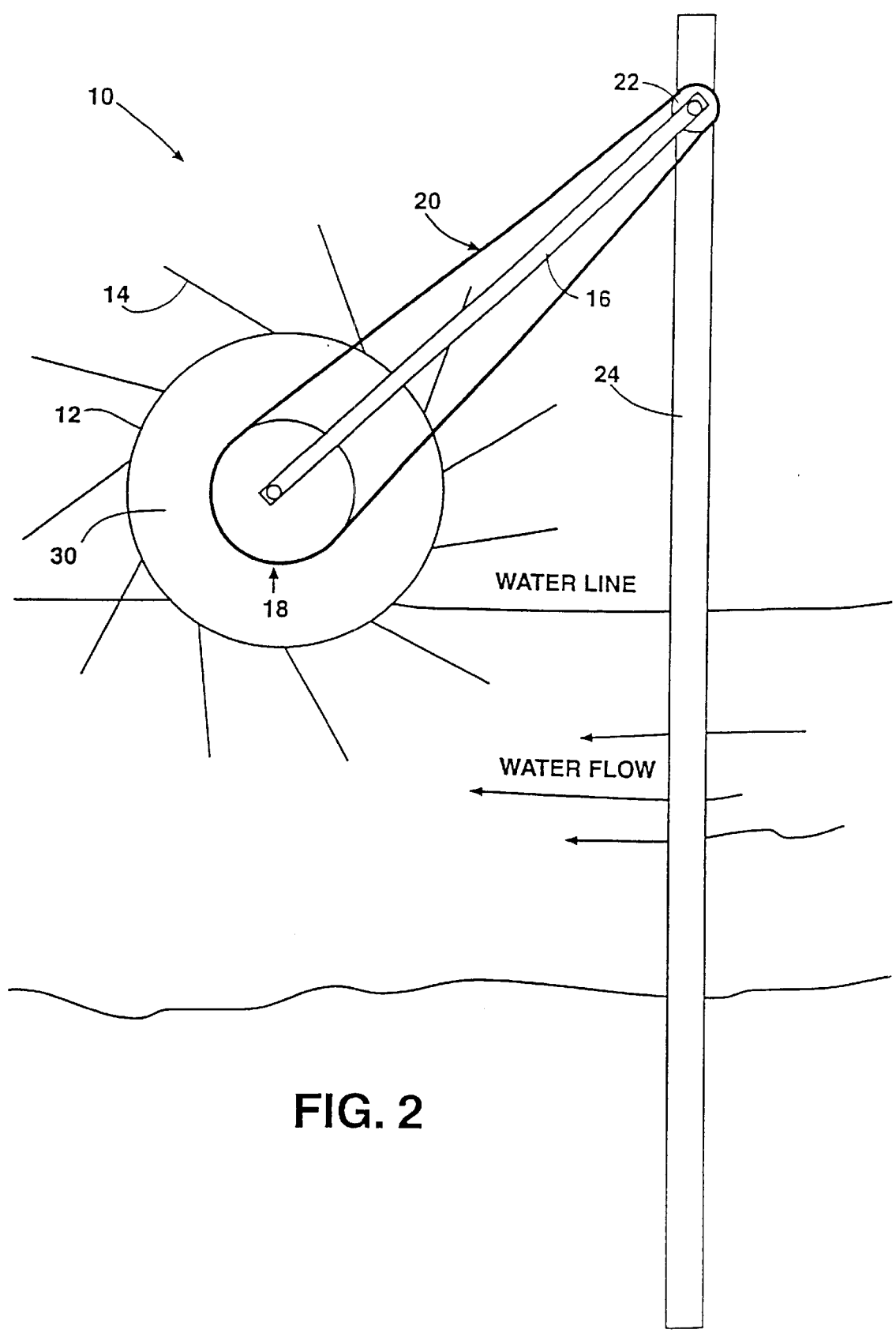
FIG. 2 is an elevational side view of the embodiment shown in FIG. 1.

FIG. 2 shows an elevational side view of this embodiment of the invention. In this situation, the anchor means 24, 24' are located within a body of water. The floating body 12 is placed within the body of water and the drive means 20, 20' are connected to the electric generator 26. As the level of flow within the stream rises and falls, the floating body 12 also rises and falls to maintain a desired profile within the water. The flow of water then pushes against the blades 14, causing the floating body 12 to rotate. This rotation is transferred from the waterwheel sprockets 18, 18' to the electric generator 26 by the drive means 20. The electric generator 26 then transfers the energy from the moving water into electrical energy. Depending upon the type of generator used, a gearing device may be desired or required to align the rotational energy from the floating device to achieve a desired rotation.

The pivoting movement of the arms 16, 16' allows the floating cylindrical body 12 to be raised and lowered with regard to the level of the water. This feature also prevents the device from being jammed from floating debris because the pivoting arms 16, 16' allow the floating body 12 to raise up when contacted by floating debris and to lower again after the floating debris has passed. This allows the debris to move under the floating cylindrical body rather than jamming the device.

Figure 3:
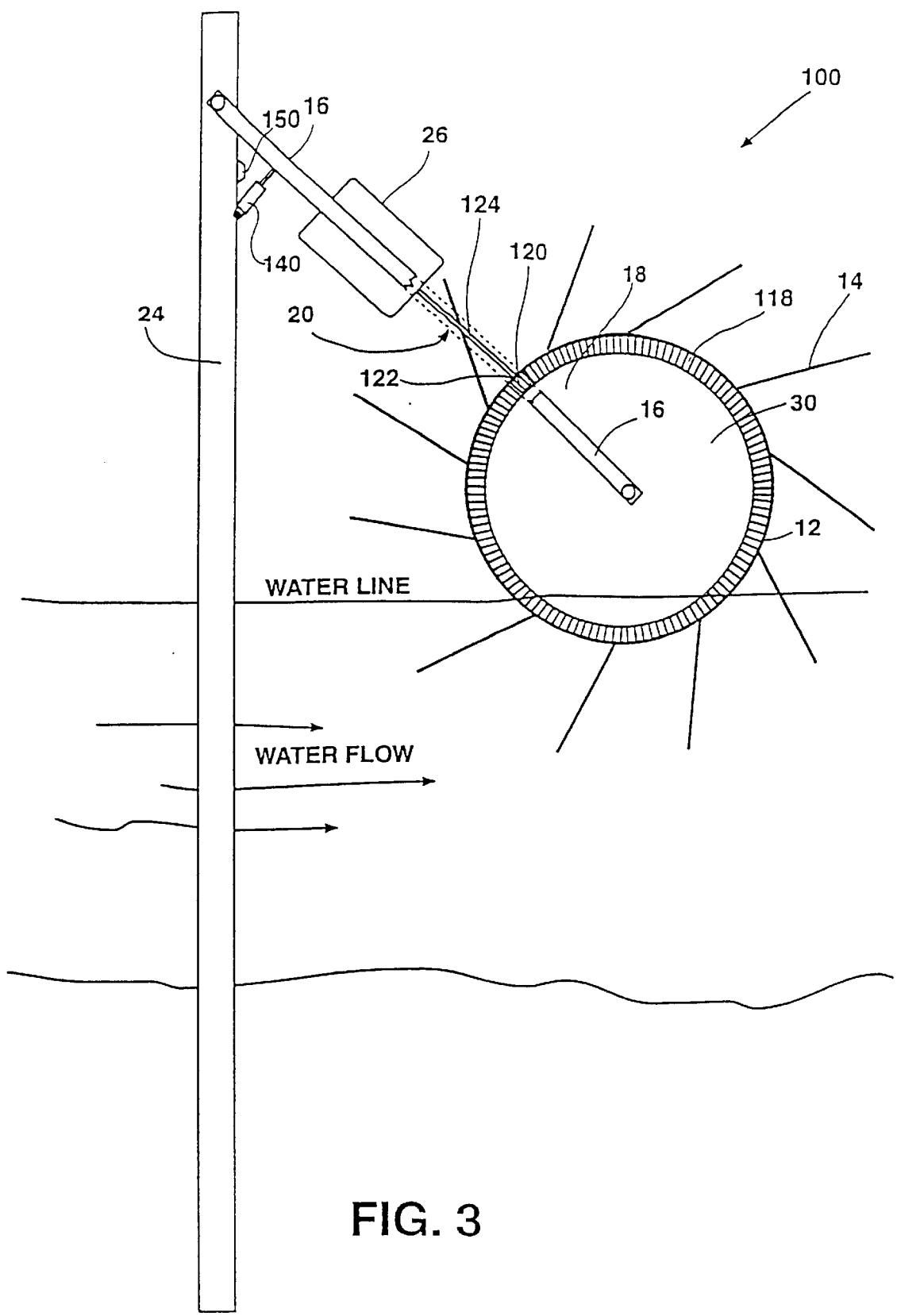
FIG. 3 is an elevational side view of a preferred second embodiment of the present invention.

FIG. 3 shows an elevational side view of the preferred second embodiment of the invention. In this embodiment, a stop 150 has been installed which limits the extent to which the arms 16, 16' will allow the floating body 12 to fall. This stop 150 is intended to prevent damage to the blades 14 and the drive mechanism 20 of the invention.

In this preferred embodiment, a lifting means 140 for raising and lowering the device into and out of the water is attached. The lifting means 140 can be used to raise or lower the device into or out of the water so as to effect repairs to the pieces of the device or to remove the device from the water during desired times of the year. In this figure, the lifting means 150 is a hydraulic cylinder. However, any method or means for raising and lowering the device 12, including by means of a mechanical device, may also be used. Depending upon the lifting means designated, the location of the placement of the stop 150 and the lifting means 140 may be adjusted.

Figure 4:
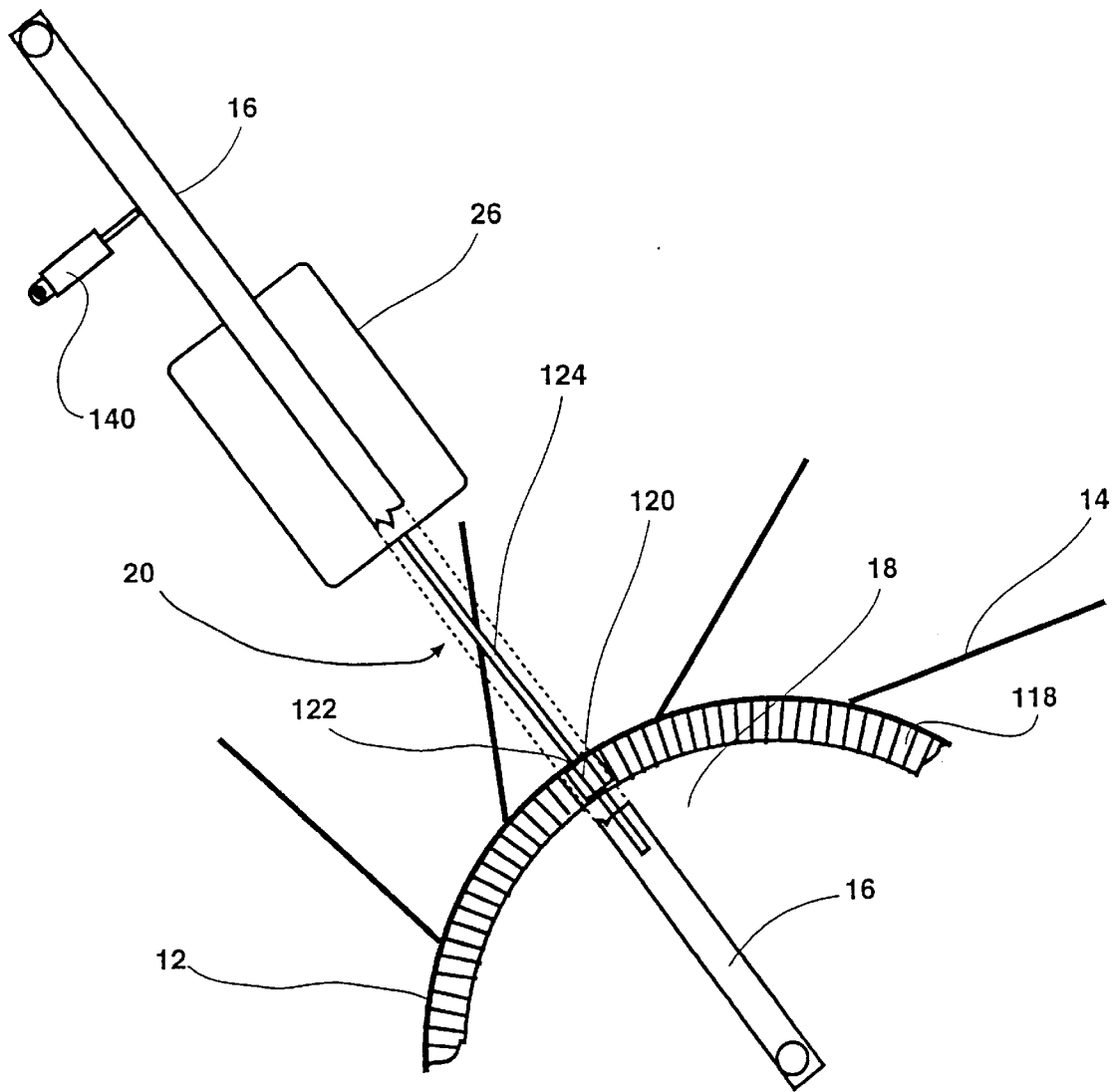
FIG. 4 is a detailed view of the drive means of the preferred second embodiment of the invention shown in FIG. 3.

In this embodiment, the waterwheel sprocket 18 has a plurality of gear teeth 118 attached. FIG. 4 shows a detailed view of these features. In this embodiment, the gear teeth 118 are configuired to interact with a receiving wheel 120 having complimentary gear teeth 122. The receiving wheel 120 is connected to a drive shaft 124, which is then drivingly connected to an electric generator. The receiving wheel 120 and the rotating drive means 124 are located within the arms 16, 16' and are designed to interact with an electric generator 26 which is also connected to the arm.

In a desired embodiment, the waterwheel sprocket 18 will have a large diameter so as to increase the mechanical advantage between the larger gears and the smaller gears. The shaft and the drive means should be placed far enough above the level of the water so as to avoid entanglements with any floating debris. In this embodiment, the drive means 20 is located within the arms 16, 16', which hold the floating, rotatable body in place. These arms are held together by a tie rod (not shown), which helps to ensure that the teeth of the waterwheel sprocket 118 and the receiving wheel teeth 122 are maintained in a working relationship.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

We claim:

1. A floating device for obtaining electric power from moving water, said device comprising:
 a body, capable of floating, having a first end extending to a second end along a circumvolving surface defining therein an inner chamber and having an access means for accessing said inner chamber;
 at least one water engaging means attached to said surface;
 a drive means connector attached to said body;
 a first arm pivotally connected to a fixed anchor and rotatably connecting said first end to said fixed anchor;
 a second arm pivotally connected to a fixed anchor and rotatably connecting said second end to said fixed anchor; and
 a drive means connecting said drive means connector to an electric generator connector;
 whereby said device is placed within a body of moving water, said moving water impacts said water engaging means and causes said body and said drive means connector to rotate, said drive means connector engaging and moving said drive means, said drive means engaging an electrical generator connector, said electrical generator creating electricity.

2. The device of claim 1 wherein said access means is a re-sealable bung.

3. The device of claim 1 wherein said water engaging means comprises at least one blade.

4. The device of claim 1 wherein said drive means connector is a sprocket.

5. The device of claim 1 wherein said drive means is a receiving gear connected to a rotating drive shaft.

6. The device of claim 1 wherein said drive means is a flexible continuous drive linkage.

7. The device of claim 6 wherein said electric generator connector is a sprocket.

8. The device of claim 1 further comprising a second drive means connector attached to said second end of said floating cylindrical body, said second drive means connector connected to a second generator connector by a second drive means.

9. The device of claim 8 wherein said second drive means is a receiving gear connected to a rotating shaft.

10. The device of claim 9 wherein said second drive means is a flexible continuous drive linkage.

11. The device of claim 9 wherein said drive means are positioned within said arms.

12. A device for obtaining electric power from moving water comprising:
 a floating cylindrical body, having a first end extending to a second end along a cylindrical surface defining therein an inner chamber and a bung for allowing access to said inner chamber;
 at least one blade attached to said cylindrical surface;
 a first waterwheel sprocket attached to said first end of said floating cylindrical body;
 a second waterwheel sprocket attached to said second end of said floating cylindrical body;
 a first arm pivotally connected to a first anchor and rotatably connected to said first end;
 a second arm pivotally connected to a second anchor and rotatably connected to said second end;
 an electric generator having a first generator sprocket and a second generator sprocket;
 a first drive means connecting said first waterwheel sprocket to said electric generator;
 a second drive means connecting said second waterwheel sprocket to said electric generator;
 whereby when said device is placed within a body of moving water, said moving water impacts against said blades and causes said floating cylindrical body to rotate, said cylindrical body causes said first and second waterwheel sprockets to rotate, engaging and moving said first and second drive means, said drive means engage said electric generator creating electricity.

13. The device of claim 12 wherein said first drive means is a receiving gear connected to a rotating shaft.

14. The device of claim 13 wherein said first drive means is located within said first arm.

15. The device of claim 13 wherein said second drive means is a receiving gear connected to a rotating shaft.

16. The device of claim 15 wherein said second drive means is located within said second arm.

17. The device of claim 12 wherein said second drive means is a flexible continuous linkage.

18. The device of claim 11 wherein a profile of said floating cylinder within said moving water can be adjusted by adding or removing materials from said inner chamber through said bung.

19. The device of claim 11 wherein said blade is coated with a water repelling substance.

20. A device for obtaining electric power from moving water comprising:

a floating cylindrical body, having a first end extending to a second end along a cylindrical surface defining therein an inner chamber having a re-sealable bung for allowing access to said inner chamber;

a plurality of blades attached to said cylindrical surface, each blade having a water repellant surface;

a first waterwheel sprocket attached to said first end of said floating cylindrical body;

a second waterwheel sprocket attached to said second end of said floating cylindrical body;

a first arm pivotally connected to a first anchor post and rotatably connected to said first end;

a second arm pivotally connected to a second anchor post and rotatably connected to said second end;

an electric generator;

a first drive means located within said first arm said first drive means comprised of a receiving gear and a rotating drive connecting said first waterwheel sprocket to said electric generator;

a second drive belt located within said second arm said second drive means comprised of a receiving gear and a rotating drive connecting said second waterwheel sprocket to said electric generator;

a lifting means connected to said arms for raising and lowering said device into and out of a body of water; and a regulating means for preventing said device from lowering beyond a predetermined point whereby when said device is placed within a body of moving water, said moving water impacts against said blades and causes said floating cylindrical body to rotate, the rotation of said cylindrical body causes said first and second waterwheel sprockets to rotate, thus engaging and moving said first and second drive means, said drive means then engage said electric generator said electric generator creating electricity.

* * * * *